(12) United States Patent
Zick et al.

(10) Patent No.: US 7,941,833 B2
(45) Date of Patent: *May 10, 2011

(54) ENHANCED SHARED SECRET PROVISIONING PROTOCOL

(75) Inventors: Donald A. Zick, Saline, MI (US); Michael J. Klein, Ann Arbor, MI (US); Robert G. Moskowitz, Oak Park, MI (US)

(73) Assignee: Microsoft Corporation, Redmond, WA (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/120,754

(22) Filed: May 15, 2008

(65) Prior Publication Data

US 2009/0319788 A1 Dec. 24, 2009

Related U.S. Application Data

(63) Continuation of application No. 10/625,846, filed on Jul. 24, 2003, now Pat. No. 7,398,550.

(51) Int. Cl.
*G06F 7/04* (2006.01)
*G06F 15/16* (2006.01)
*G06F 17/30* (2006.01)
*H04L 29/06* (2006.01)

(52) U.S. Cl. ............................................ 726/5; 713/186
(58) Field of Classification Search ....... 726/5; 713/186
See application file for complete search history.

(56) References Cited

U.S. PATENT DOCUMENTS

| | | | |
|---|---|---|---|
| 5,537,474 A | 7/1996 | Brown et al. | |
| 5,625,888 A | 4/1997 | Ruther et al. | |
| 5,978,669 A * | 11/1999 | Sanmugam | 455/410 |
| 6,119,001 A | 9/2000 | Delis et al. | |
| 6,169,893 B1 | 1/2001 | Shaheen et al. | |
| 6,442,616 B1 * | 8/2002 | Inoue et al. | 709/245 |
| 6,483,920 B2 * | 11/2002 | Pinkas | 380/286 |
| 6,591,364 B1 | 7/2003 | Patel | |
| 6,690,659 B1 | 2/2004 | Ahmed et al. | |

(Continued)

FOREIGN PATENT DOCUMENTS

EP 0254812 4/1987

(Continued)

OTHER PUBLICATIONS

CDMA 1XRTT Security Overview, by C. Wingert and M. Naidu, Aug. 2002.

(Continued)

*Primary Examiner* — Farid Homayounmehr
(74) *Attorney, Agent, or Firm* — Wolf, Greenfield & Sacks, P.C.

(57) ABSTRACT

An Enhanced Shared Secret Provisioning Protocol (ESSPP) provides a novel method and system for adding devices to a network in a secure manner. A registration process is launched at two network devices together within a predetermined time interval. These two devices then automatically register with each other. When two devices running ESSPP detect each other, they exchange identities and establish a key that can later be used by the devices to mutually authenticate each other and generate session encryption keys. With ESSPP, two ESSPP devices that are attempting to register with each other will only provision a key when they detect that they are the only two ESSPP devices on the wireless network running ESSPP. If additional devices running ESSPP are detected, the ESSPP protocol is either terminated or suspended.

15 Claims, 3 Drawing Sheets

U.S. PATENT DOCUMENTS

| | | | |
|---|---|---|---|
| 6,782,260 B2 * | 8/2004 | Nakakita et al. | 455/435.1 |
| 6,826,401 B1 | 11/2004 | Morvan et al. | |
| 6,934,838 B1 * | 8/2005 | Boyce et al. | 713/156 |
| 6,973,581 B2 * | 12/2005 | Chung et al. | 726/13 |
| 7,152,238 B1 | 12/2006 | Leung et al. | |
| 7,221,781 B2 * | 5/2007 | Silverbrook et al. | 382/119 |
| 7,251,825 B2 * | 7/2007 | Collet | 726/5 |
| 7,324,805 B2 * | 1/2008 | Nakakita et al. | 455/411 |
| 7,398,550 B2 * | 7/2008 | Zick et al. | 726/5 |
| 7,430,606 B1 * | 9/2008 | Meandzija et al. | 709/229 |
| 7,480,934 B2 * | 1/2009 | Chan et al. | 726/8 |
| 7,529,935 B2 * | 5/2009 | Saito et al. | 713/168 |
| 7,610,619 B2 * | 10/2009 | Kastelewicz et al. | 726/10 |
| 7,631,193 B1 * | 12/2009 | Hoffman | 713/186 |
| 7,774,603 B2 * | 8/2010 | Iwamura | 713/171 |
| 7,805,606 B2 * | 9/2010 | Birger et al. | 713/168 |
| 2002/0012433 A1 | 1/2002 | Haverinen et al. | |
| 2002/0152405 A1 * | 10/2002 | Colvin | 713/202 |
| 2003/0129979 A1 | 7/2003 | Cooper | |
| 2004/0054893 A1 * | 3/2004 | Ellis | 713/165 |
| 2004/0203773 A1 | 10/2004 | Balasubramanian et al. | |
| 2005/0102517 A1 | 5/2005 | Paddon et al. | |
| 2005/0177750 A1 * | 8/2005 | Gasparini et al. | 713/201 |
| 2005/0210290 A1 * | 9/2005 | Ono et al. | 713/201 |
| 2005/0273628 A1 * | 12/2005 | Onischuk | 713/186 |
| 2008/0196092 A1 * | 8/2008 | Benschop et al. | 726/5 |
| 2009/0235085 A1 * | 9/2009 | Mathur | 713/186 |

FOREIGN PATENT DOCUMENTS

| | | |
|---|---|---|
| EP | 1117271 | 11/2000 |
| WO | 00/72499 | 5/2000 |

OTHER PUBLICATIONS

XP-002296898, "Shared Secret Provisioning Protocol," by R. Moskowitz, ICSA Labs, Jan. 2003, pp. 1-6.

L Blunk, et al., PPP Extensible Authentication Protocol (EAP), Network Working Group Request for Comments, Marhc 1, 1998 (XP-002239395).

B. Aboba, et al. "EAP GSS Authentication Protocol", Internet-Draft, <draft-aboba-pppext-eapgss-12.txt>, http://www.ietf.org/ietf/1id-abstracts.html, The Internet Society, Apr. 2002.

H. Haverinen, "EAP SIM Authentication", Internet-Draft, <draft-haverinen-pppext-eap-sim-04.txt>, http://www.ietf.org/ietf/1id-abstracts.html, The Internet Society, Jun. 2002.

J. Arkko, et al. "EAP AKA Authentication", Internet-Draft, <draft-arkko-pppext-eap-aka-03.txt>, http://www.ietf.org/ietf/1id-abstracts.html, The Internet Society, Feb. 2002.

H. Andersson, et al., "Protected EAP Protocol (PEAP)", Internet-Draft, <draft-josefsson-pppext-eap-tls-eap-02.txt>, http://www.ietf.org/ietf/1id-abstracts.html, The Internet Society, Feb. 2002.

B. Aboba, et al., "The EAP Keying Problem", Internet-Draft, <draft-aboba-pppext-key-problem-01.txt>, http://www.ietf.org/ietf/1id-abstracts.html, The Internet Society, Feb. 2002.

G. Tsirtsis, "EAP over ICMP", Internet-Draft, <draft-tsirtsis-eap-over-icmp-00.txt>, http://www.ietf.org/ietf/1id-abstracts.html, The Internet Society, Jan. 2002.

S. Josefsson, "The EAP SecrID(r) Mechanism", Internet-Draft, <draft-josefsson-eap-securid>, http://www.ietf.org/ietf/1id-abstracts.html, The Internet Society, Feb. 2002.

D. Potter et al., "PPP EAP MS-CHAP-V2 Authentication Protocol", Internet-Draft, <draft-dpotter-pppext-eap-mschap-01.txt>, http://www.ietf.org/ietf/1id-abstracts.html, The Internet Society, Jan. 2002.

B. Aboba, "EAP IANA Considerations", Internet-Draft, <draft-aboba-pppext.eap-iana-01.txt>, http://www.ietf.org/ietf/1id-abstracts.html, The Internet Society, Feb. 2002.

B. Aboba, "The Vendor-Specific EAP Method", Internet-Draft, <draft-aboba-pppext-eap-vendor-01.txt>, http://www.ietf.org/ietf/1id-abstracts.html, The Internet Society, Feb. 2002.

P. Engelstad, "EAP over UDP (EAPoUDP)", Internet-Draft, <draft-engelstad-pana-eap-over-udp-00.txt>, http://www.ietf.org/ietf/1id-abstracts.html, The Internet Society, Feb. 2002.

B. Aboba et al., "RADIUS Support for Extensible Authentication Protocol (EAP)", Internet-Draft, <draft-aboba-radius-rfc2869bis-02.txt>, http://www.ietf.org/ietf/1id-abstracts.html, The Internet Society, May 2002.

B. Payne, "Extensible Authentication Protocol State Machine", Internet-Draft, <draft-payne-eap-sm-00.txt>, http://www.ietf.org/ietf/1id-abstracts.html, The Internet Society, May 2002.

P. Funk et al., "EAP Tunneled TLS Authentication Protocol (EAP-TTLS)", Internet-Draft, <draft-ietf-pppext-eap-ttls-01.txt>, http://www.ietf.org/ietf/1id-abstracts.html, The Internet Society, Aug. 2001.

L. Blunk et al., "Extensible Authentication Protocol (EAP)", Internet-Draft, <draft-iet-pppext-rfc2284bis-04.txt>, http://www.ietf.org/ietf/1id-abstracts.html, The Internet Society, Apr. 2002.

W. Simpson, "The Point-to-Point Protocol (PPP)", Network Working Group, Jul. 1994.

L. Blunk et al., "PPP Extensible Authentication Protocol (EAP)", Network Working Group, Mar. 1998.

B. Aboba et al., "PPP EAP TLS Authentication Protocol", Network Working Group, Oct. 1999.

\* cited by examiner

ENHANCED SHARED SECRET PROVISIONING PROTOCOL

CROSS-REFERENCE

This application is a continuation of U.S. patent application Ser. No. 10/625,846, filed Jul. 24, 2003 and entitled ENHANCED SHARED SECRET PROVISIONING PROTOCOL, which claims priority to U.S. Provisional Application Ser. No. 60/479,176, filed Jun. 18, 2003, the entirety of which is incorporated herein by reference.

FIELD OF THE INVENTION

The present invention relates to the field of secure network registration processes that allow two network devices to register with each other, and more particularly to a registration process where two devices learn each other's identities and establish a shared key that can later be used by the devices to mutually authenticate each other and to generate session encryption keys.

BACKGROUND OF THE INVENTION

The protection of information and secrets over a network requires the use of secure methods to add new devices to the network. It is possible to breach network security and gain access to network information and secrets through interfering with the registration process of devices with the network. One method of interfering with the registration of network devices is through interjecting an imposter device into the registration process. If this imposter device can successfully pose as the legitimate device during the registration process, then it is possible for the imposter device to register with the network and masquerade as the legitimate device. As a result, the imposter device can gain access to the information and secrets stored on the network. It is therefore desirable to develop methods and systems that can provide a secure method for registering a device with a network.

A variety of methods and systems are known to facilitate communications between two devices. One such protocol is the Diffie-Hellman key agreement protocol. The Diffie-Hellman key agreement protocol (also called exponential key agreement) was developed by Diffie and Hellman in 1976 and published in the paper "New Directions in Cryptography." The protocol allows two users to exchange a secret key over an insecure medium without any prior secrets. The protocol has two system parameters p and g. They are both public and may be used by all the users in a system. Parameter p is a prime number and parameter g (usually called a generator) is an integer less than p, which is capable of generating every element from 1 to p−1 when multiplied by itself a certain number of times, modulo the prime p. The protocol depends on the discrete logarithm problem for its security. It assumes that it is computationally infeasible to calculate the shared secret key $k=g^{ab}$ mod p given the two public values $g^a$ mod p and $g^b$ mod p when the prime p is sufficiently large. Breaking the Diffie-Hellman protocol is equivalent to computing discrete logarithms under certain assumptions.

Another system is the Point-to-Point Protocol (PPP) Extensible Authentication Protocol (EAP). EAP is a general system for PPP authentication that is compatible with a variety of authentication mechanisms. EAP does not select a specific authentication mechanism at a Link Control Phase, but rather postpones this selection until an Authentication Phase. This postponement enables the authenticator to request more information prior to determining the specific authentication mechanism. In addition, this postponement also enables the use of a "back-end" server that actually implements the various mechanisms while the PPP authenticator merely passes through the authentication exchange.

RSA is yet another protocol system that provides an algorithm for public key cryptography. The "key" of an RSA cipher has three numbers: the first is the public exponent, the second is the private exponent, and the third is the modulus. The public key is formed from the public exponent and the modulus. The private key is formed from the private exponent and modulus. If two devices are to engage in encrypted communications, they each generate a pair of keys. These devices then may exchange public keys using a non-secure communications channel. Thereafter, when the devices engage in encrypted communications, one device can encrypt the message using the other devices' public key and send it via a non-secure channel. Since the private keys are not exchanged, decryption by an eves dropper proves difficult.

Consider the case of a wireless network with an access point in infrastructure mode. Suppose a user buys a wireless printer and wants to connect the printer to the network. If Wi-Fi Protected Access (WPA) is enabled on the access point, the user has a variety of options for setting up a secure connection between the access point and printer:

The user can install an 802.11 pre-shared key on the access point and on the printer. Note that pre-shared keys are not device-specific. Also, multiple devices may utilize the same pre-shared key to connect to an access point. Alternatively, if the access point is a client to a Remote Authentication Dial in User Server (RADIUS), or includes the capabilities of a RADIUS server, the printer name and credentials can be added to the RADIUS server database. A RADIUS server is used to authenticate and return parameters including the users IP address, gateway, and DNS server. The printer credentials must also be installed on the printer. The credentials may be a password, key, or certificate. The RADIUS server and printer are also configured to perform the same type of EAP authentication, with the printer acting as the supplicant.

SUMMARY OF THE INVENTION

The present invention is for an Enhanced Shared Secret Provisioning Protocol (ESSPP). ESSPP provides a novel method and system for adding devices to a network in a secure manner. With ESSPP, two network devices that are attempting to register with each other and establish a secure communications link are both provided with a mechanism for starting ESSPP. Examples of these network devices include servers, wireless printers, wireless computers, and network access points. The mechanism may be to select a button located on the device that triggers the ESSPP process, a menu selection provided in a Graphical User Interface (GUI) shown on a display provided with the device, or to enter a code on a terminal of the device. When, for example, two devices such as the printer and access point run ESSPP at the same time, the two devices automatically register with each other. The ESSPP process allows for registration of network devices without the need to manually install encrypted keys, passwords, or certificates to add the device to the network.

When a device runs ESSPP, it searches for another device running ESSPP. When two devices running ESSPP detect each other they exchange identities and establish a key that can later be used by the devices to mutually authenticate each other and generate session encryption keys. In a wireless network, the established key can be used as a pre-shared key or it can be used for 802.1x authentication using an Extensible Authentication Protocol (EAP).

Different techniques are utilized to protect against intruder devices. A Shared Secret Provisioning Protocol (SSPP) is used to establish credentials. SSPP is structured such that it is resistant to passive attacks. Additional methods are used to protect against active man-in-the-middle attacks. SSPP is a preferred system for establishing credentials, other types of key exchanges function with ESSPP. For example, an RSA-style key exchange is compatible with ESSPP.

With ESSPP, two ESSPP devices that are attempting to register with each other will only provision a key when they detect that they are the only two ESSPP devices on the wireless network running ESSPP. If additional devices running ESSPP are detected, the ESSPP protocol is either terminated or suspended.

The ESSPP process is initiated when two network devices launch ESSPP within a predetermined time interval of each other. Specifically, when ESSPP is launched at one network device through the pressing of a button or selection of a menu option, there is a window of time during which ESSPP can be launched at the second network device. If ESSPP is not launched within this window of time at the second device, then the ESSPP process terminates. Through providing this temporal requirement that ESSPP launch within a predetermined time interval at both devices, the security of the registration process is enhanced.

In addition, in an alternative embodiment, an ESSPP supplicant device may be labeled with a short PIN. The user is required to enter the PIN on the authenticating device for ESSPP to succeed, thereby providing additional security. In another embodiment, a short PIN may be entered at both devices when ESSPP is run. The user selects a unique PIN that need not be remembered.

ESSPP allows for automatic registration of two devices through a process where each device learns the other's identity and learns that the devices are allowed to communicate with each other. In addition, ESSPP is a button, or menu activated process that does not require a user to manually enter passwords, or install credential files, or certificates. ESSPP provides an optional PIN code support, thereby providing added security in some network environments. The short PIN is used once to establish strong password credentials.

ESSPP also provides protection from passive and active attacks during the protocol exchange. ESSPP utilizes generation of a shared key that can be used to secure the connection between the two devices. There is also an optional generation of pseudonyms that can be used by the devices to identify each other during EAP authentication without revealing their true identities on the network.

ESSPP also provides for an optional anonymous registration that allows two devices to run ESSPP without revealing their identities on the network. ESSPP is an efficient mechanism for changing a shared key once the key is established. Cancellation of a registration is provided for by ESSPP if a device detects more than one other device in ESSPP mode. Further, ESSPP supports methods for authenticating using established credentials.

BRIEF DESCRIPTION OF THE DRAWINGS

The present invention is further described in the detailed description which follows, in reference to the noted drawings by way of non-limiting examples of certain embodiments of the present invention, in which like numerals represent like elements throughout the several views of the drawings, and wherein.

DETAILED DESCRIPTION OF PREFERRED EMBODIMENTS

Figure 1:
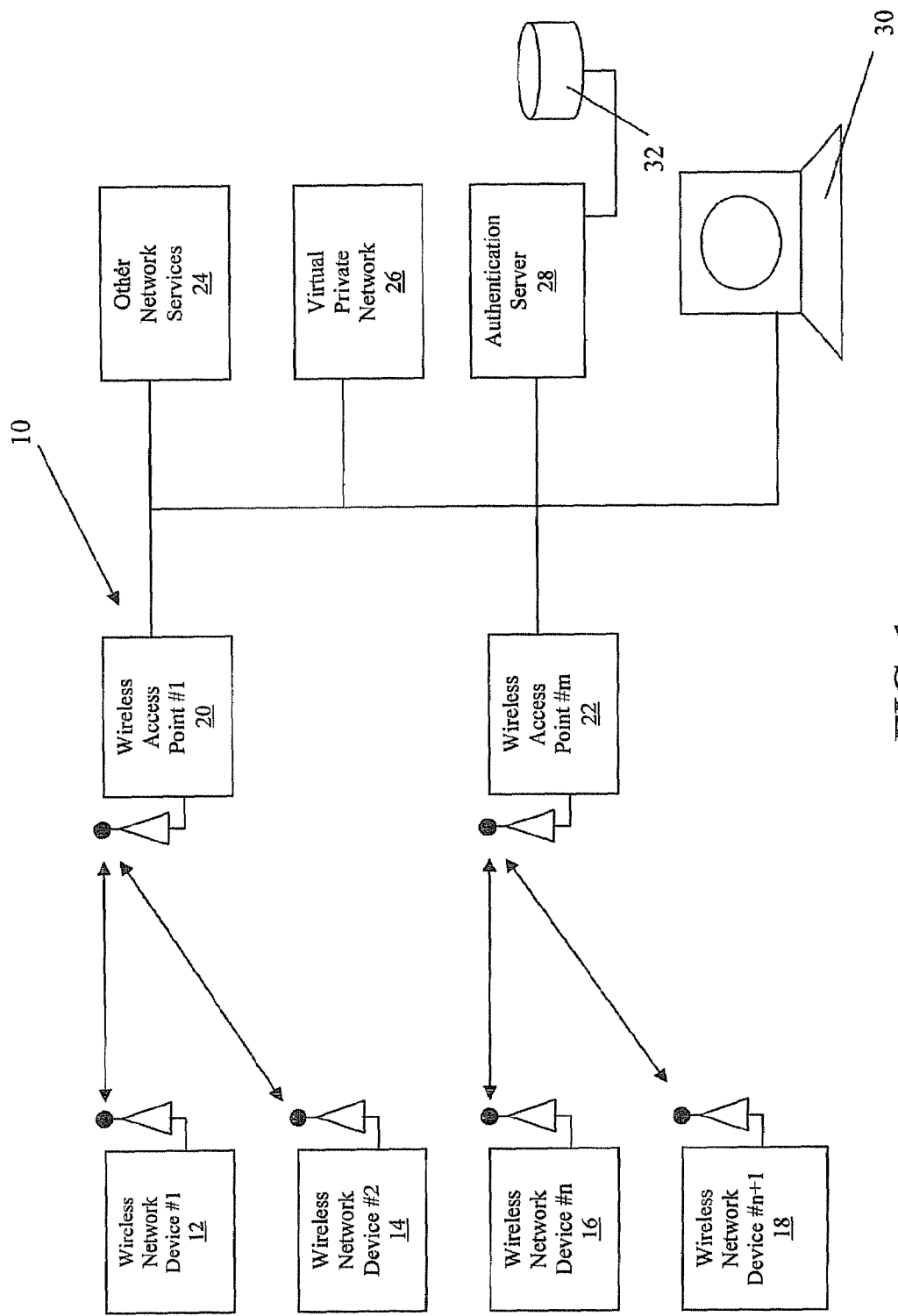
FIG. 1 illustrates a Wi-Fi network that supports ESSPP in accordance with a preferred embodiment of the present invention.

The particulars shown here are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A novel method and system for registering devices with a network in a secure manner is provided through an Enhanced Secure Shared Provisioning Protocol (ESSPP). With ESSPP, two network devices that are attempting to register with each other and establish a secure communications link are both provided with a mechanism for starting ESSPP. In order to launch the ESSPP registration process, these mechanisms are activated together within a predetermined time interval. If both of these devices do not launch ESSPP together within this predetermined time interval, the ESSPP registration protocol does not begin. When launched at both devices within the predetermined time interval, ESSPP enables a secure registration process for the two network devices. Through requiring that these mechanisms for launching ESSPP are activated within the predetermined time interval, the probability that a third device would intrude upon the registration of the two devices is reduced.

A preferred general process flow for ESSPP is provided in protocol flow 1 below. Alternative process flows for ESSPP are provided in protocol flows 2-7 and 9-10. Protocol flow 8 illustrates how credentials established by other flows can be used for authentication. The mathematical terminology used for the purposes of describing the ESSPP process flows is documented in the Internet Engineering Task Force (IETF) Internet Draft "draft-moskowitz-shared-secret-provprotocol-01.txt". This IETF document describes a Shared Secret Provisioning Protocol. Where possible, the same notation used in SSPP is used here.

| | |
|---|---|
| $(X_s, Y_s)$ | Server's Diffie-Hellman static key pair |
| $(X_c, Y_c)$ | Client's Diffie-Hellman static key pair |
| $(p, q, g)$ | Diffie-Hellman domain parameters, known by Server and Client before exchange |
| AddressS | Server's address |
| NonceS | Random number generated by Server used in the exchange |
| AddressC | Client's address |
| NonceC | Random number generated by Client used in the exchange |
| $Z_s$ | Diffie-Hellman generated shared secret ($Y_s \hat{\ } X_c \bmod p$) or (($Y_c \hat{\ } X_s \bmod p$) |

| | |
|---|---|
| kdf | Key Derivation Function specified in SSPP |
| k | Shared key generated by Client and Server as: kdf(Zs, AddressC, AddressS, keydatalen, hashlen, NonceC, NonceS) |
| PIN | Short password - typically a 4 digit number |
| proofS | A hash generated by Server to prove he knows Zs. Calculated as: LTRUN96 (HMAC-SHA1(Zs, (Yc || AddressC || NonceC [|| PIN]))) The PIN may optionally be included in the hash. LTRUN96 performs a left truncation, returning the left most 96 bits of data. |
| proofC | A hash generated by Client to prove she knows Zs. Calculated as: LTRUN96 (HMAC-SHA1(Zs, (AddressC || NonceC [|| PIN]))) The PIN may optionally be included in the hash. |
| Base64Encode( ) | A function that converts binary data into displayable text characters |
| pseudonymS | Pseudonym for Server |
| pseudonymC | Pseudonym for Client |

Protocol Flow 1

Protocol flow 1 illustrates ESSPP in its simplest form. Two network devices, such as a server and client, exchange addresses and public keys. Both of these devices derive shared key k that they can later use to authenticate each other.

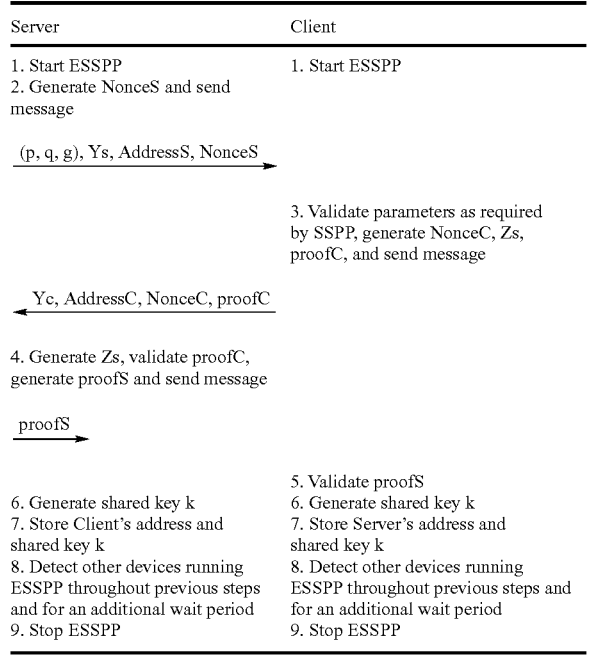

| Server | Client |
|---|---|
| 1. Start ESSPP | 1. Start ESSPP |
| 2. Generate NonceS and send message | |
| (p, q, g), Ys, AddressS, NonceS → | |
| | 3. Validate parameters as required by SSPP, generate NonceC, Zs, proofC, and send message |
| ← Yc, AddressC, NonceC, proofC | |
| 4. Generate Zs, validate proofC, generate proofS and send message | |
| proofS → | |
| | 5. Validate proofS |
| 6. Generate shared key k | 6. Generate shared key k |
| 7. Store Client's address and shared key k | 7. Store Server's address and shared key k |
| 8. Detect other devices running ESSPP throughout previous steps and for an additional wait period | 8. Detect other devices running ESSPP throughout previous steps and for an additional wait period |
| 9. Stop ESSPP | 9. Stop ESSPP |

Once shared key k has been established, Server and Client can authenticate each other using the shared key k as the hidden credential.

Referring to step 1 of protocol flow 1 illustrated above, the server and the client start ESSPP within a predetermined time interval of one another. ESSPP is launched in step 1 through an activation of a mechanism that is located on both the server and the client. Requiring that ESSPP launch at both network devices within the predetermined time interval reduces the ability of a third network device to intrude and interfere with the ESSPP registration process. This mechanism may be referred to as a trigger, or a simultaneous registration trigger. The actual mechanism on the device can take the form of a button, a menu selection, or other triggering device.

The predetermined time interval has a length that can be set depending upon the application and network environment. Predetermined time intervals on the order of seconds may be appropriate where there is one operator who can trigger each ESSPP launch mechanism supported on each network device. However, where there is one operator who has to trigger both network device mechanisms on devices that are on different floors of a building, the predetermined time interval may have a length on the order of minutes.

In step 1, the server and the client broadcast a set of registration protocol startup messages to each other in an exchange in order to initiate the ESSPP between the two devices. These startup messages are an initial "handshake" between the two network devices that enable the implementation of ESSPP. For instance, these initial start up messages may include a wireless network device searching for the location of access points on a network.

In steps 2, 3, 4, and 5, information is exchanged and verified between the two network devices to facilitate generation of a shared key k in step 6. In step 2, nonceS is generated and a message sent from the server to the client. In step 3, the parameters sent in the message of step 2 are validated as required by SSPP by the client. NonceC, Zs, and proofC are then generated by the client and sent via message to the server. The values Zs and proofS are generated in step 4. Also in step 4, proofC is validated and proof S is sent via a message to the client. In step 5, the client validates proofS. Generation of shared key k enables encrypted communications between the server and the client. This shared key k along with the address is then stored within a database in step 7.

During the entire process, a monitoring system is provided on both network devices to detect ESSPP communications from a third device that is attempting to intrude and interfere in the ESSPP process running between the server and the client as noted in step 8. If and when these ESSPP communications from a third device are detected, in a preferred embodiment the ESSPP process is terminated. The ESSPP process is then not restarted until such time as the process is reset and the trigger mechanisms on both devices reactivated. Alternatively, with detection of ESSPP communications from the third device, the process may be suspended for such a time and then reinitiated at the same or a previous step at a later time period.

ESSPP messages that are detected by the monitoring system are messages that have a format in accordance with the ESSPP process as outlined above. This format is detected through looking at the structure of the message to determine if it contains ESSPP information as outlined above.

If no such ESSPP communications are detected from the third device, the process flows to step 9 where ESSPP process is completed and stops. When ESSPP is completed and stops in step 9, the registration process is complete and a registration has been established between the server and the client, thereby enabling secure communications between them while avoiding potential man in the middle attacks. In a preferred embodiment, the protocol flow of flow 1 utilizes a Diffie-Hellman key exchange process.

Protecting Against Man-in-the-Middle Attacks

| Alice | Carol | Bob |
|---|---|---|
| ← Conversation encrypted using k1 → | ← Conversation encrypted using k2 → | |

A man-in-the-middle attack would allow an imposter Carol between Alice and Bob. When Alice thinks she is talking to Bob, she in fact is talking to Carol, and when Bob thinks he is talking to Alice, he in fact is talking to Carol. The man-in-the middle attack allows Carol to establish a shared key k1 with Alice and a shared key k2 with Bob. Carol can decipher all traffic between Alice and Bob and can modify messages in the conversation.

The SSPP draft points out the need to protect against man-in-the-middle attacks. ESSPP provides a new approach for protecting against a man-in-the-middle attack that is less burdensome on users than prior art. To protect against a man-in-the-middle attack, only two devices on the network are allowed to run ESSPP at a time. If either the Client or Server receives ESSPP messages from more than one device, the protocol exchange will fail. Client and Server devices keep listening for ESSPP messages for a period of time after a successful registration, trying to detect any other device running ESSPP. If a third device is detected running ESSPP after a successful registration, the detecting device destroys its copy of the generated shared key and attempts to inform the device it registered with that the registration has been discarded. This approach is appropriate on networks where it is not feasible for an attacking device to disrupt traffic between two devices without detection.

Protocol Flow 2

Protocol flow 2 is an alternative flow that illustrates how a PIN can be used with ESSPP. This is useful when ESSPP is run on networks where it is feasible for an attacker to disrupt communications between a Server and Client without detection. The use of a PIN provides additional security to the ESSPP process.

| Server | Client |
|---|---|
| 1. Start ESSPP, entering a PIN. Use the same PIN that is entered at the Client device or that is PIN pre-programmed into the Client device. | 1. Start ESSPP, entering a PIN on a keypad if necessary, or using a PIN pre-programmed into the Client device. A pre-programmed PIN should appear on a label on the Client device. |
| 2. Generate NonceS and send message | |
| (p, q, g), Ys, AddressS, NonceS → | |
| | 3. Validate parameters as required by SSPP, generate NonceC, Zs, proofC. Include PIN in the calculation of proofC. Send message. |
| ← Yc, AddressC, NonceC, proofC | |
| 4. Generate Zs, validate proofC, generate proofs. Include PIN in the calculation of proofS. Send message | |
| proofS → | |
| | 5. Validate proofS |
| 6. Generate shared key k | 6. Generate shared key k |
| 7. Store Client's address and shared key k | 7. Store Server's address and shared key k |
| 8. Detect other devices running ESSPP throughout previous steps and for an additional wait period | 8. Detect other devices running ESSPP throughout previous steps and for an additional wait period |
| 9. Stop ESSPP | 9. Stop ESSPP |

If a device is able to disrupt communications between the Server and Client without detection, the device still has a very low probability of being able to mount a successful man-in-the-middle attack. A successful man-in-the-middle attack would require an attacking device to guess the PIN in a single try during the protocol exchange. Referring to step 1 of protocol flow 2, the PIN number entered at the server and the client is included in the calculations of proofC and proofS. Therefore, the PIN number is utilized once in the ESSPP process. As a result, an attacking device has a single opportunity to correctly guess the PIN number, thereby providing enhanced security for the ESSPP process.

Referring to step 1 of protocol flow 2 illustrated above, the server and the client start ESSPP within a predetermined time interval of one another. Server and client start ESSPP when registration triggers are activated on both server and client together within the predetermined time interval. In step 1, the server and the client broadcast a set of registration protocol startup messages to each other in an exchange in order to initiate the ESSPP between the two devices.

Note that as with protocol 1, the detection or monitoring of ESSPP communications from a third network device as illustrated in step 8 runs throughout the entire ESSPP process. As a result, for instance, the monitoring systems on the server and client will listen for a second message transmitted in steps 2, 3, or 4. For example, if two proofS messages are received from the client in step 4, then a third network device is participating in the ESSPP registration. As a result, the ESSPP process will terminate without completing the registration between the two network devices.

Note that steps 3 and 4 differ from protocol flow 1 in that the PIN number is used to generate proofC and proofS. Protocol flow 2 is implemented utilizing a Diffie-Hellman key exchange process.

Protocol Flow 3

Protocol flow 3 illustrates an alternative embodiment of ESSPP that is similar to the preferred embodiment illustrated in flow 1, but in this alternative embodiment pseudonyms are derived. The pseudonyms can be used by the Server and Client to identify each other on the network without revealing their true identities.

Flows 1 and 2 dealt with device addresses, but in this flow each device also has an associated identity. The identity is sent in the clear during the ESSPP protocol exchange. The generated pseudonyms can be used by the devices to identify each other once the ESSPP protocol exchange completes.

| Server | Client |
|---|---|
| 1. Start ESSPP | 1. Start ESSPP |
| 2. Generate NonceS and send message | |
| (p, q, g), Ys, AddressS, NonceS, "Alice" → | |
| | 3. Validate parameters as required by SSPP, generate NonceS, Zs, proofC, and send message |
| ← Yc, AddressC, NonceC, proofC, "Bob" | |
| 4. Generate Zs, validate proofC, generate proofS and send message | |
| proofS → | |
| | 5. Validate proofS |
| 6. Generate shared key k | 6. Generate shared key k |
| 7. Use kdf( ) to generate pseudonymC | 7. Use kdf( ) to generate pseudonymS |

-continued

| Server | Client |
|---|---|
| 8. pseudonymC = Base64Encode (pseudonymC) | 8. pseudonymS = Base64Encode (pseudonymS) |
| 9. Store Client's address and shared key k along with pseudonymC | 9. Store Server's address and shared key k along with pseudonymS |
| 10. Detect other devices running ESSPP throughout previous steps and for an additional wait period | 10. Detect other devices running ESSPP throughout previous steps and for an additional wait period |
| 11. Stop ESSPP | 11. Stop ESSPP |

In step 7, a key derivation function is used to generate pseudonyms. The Client and Server generate each other's pseudonyms and store them so that they can be used as an index into the credential database. The Client and Server can generate their own pseudonyms at any time, because their own pseudonyms are not indexes into the credential database.

Referring to step 1 of protocol flow 3 illustrated above, the server and the client start ESSPP within a predetermined time interval of one another. Server and client start ESSPP when registration triggers are activated on both server and client together within the predetermined time interval. In step 1, the server and the client broadcast a set of registration protocol startup messages to each other in an exchange in order to initiate the ESSPP between the two devices.

In step 7, the key derivation function kdf is used to generate pseudonymC and pseudonymS. Note however, that these pseudonyms are merely random numbers. In step 8, ESSPP converts these random numbers into an identifier for use on the network through a Base64Encode. Base64Encode converts the random number into a display field character. In this manner, it is then possible for the two network devices, client and server, to identify each other over the network through the use of pseudonyms without having to reveal their true identities.

Note that steps 2 and 3 of protocol flow 3, the network devices reveal their identities to each other. Protocol flow 3 is implemented utilizing a Diffie-Hellman key exchange protocol.

Protocol Flow 4

Protocol flow 4 illustrates an alternative embodiment of the ESSPP protocol flow illustrated in flow 1. Protocol flow 4 is similar to flow 3, but in this case, the two network devices, server and client, commonly referred to as Alice and Bob in cryptographic parlance, do not reveal their identities during the registration process.

| Server | Client |
|---|---|
| 1. Start ESSPP | 1. Start ESSPP |
| 2. Generate NonceS and send message | |

(p, q, g), Ys, AddressS, NonceS →

| | 3. Validate parameters as required by SSPP, generate NonceC, Zs, proofC, and send message |

← Yc, AddressC, NonceC, proofC

| 4. Generate Zs, validate proofC, generate proofS and send message | |

-continued

| Server | Client |
|---|---|
| | proofS → |
| | 5. Validate proofS |
| 6. Generate shared key k | 6. Generate shared key k |
| 7. Detect other devices running ESSPP. ESSPP. Wait for delay period to ensure there's no man-in-the-middle making noise. This is not necessary when a PIN is included in the exchange. | 7. Detect other devices running ESSPP. Wait for delay period to ensure there's no man-in-the-middle making noise. This is not necessary when a PIN is included in the exchange. |
| 8. Use kdf( ) to derive encryption keys to encrypt Server name and decrypt Client name | 8. Use kdf( ) to derivee encryption keys to encrypt Client name and decrypt Server name |
| 9. Use key from step 8 to encrypt Server name into EncryptedAlice field | 9. Use key from step 8 to encrypt Client name into EncryptedBob field |
| 10. Send encrypted name | |

EncryptedAlice →

| | 11. Send encrypted name |

← EncryptedBob

| 12. Use key from step 8 to get "Bob" from EncryptedBob | 12. Use key from step 8 to get "Alice" from EncryptedAlice |
| 13. Use kdf( ) to generate pseudonymC | 13. Use kdf( ) to generate pseudonymS |
| 14. pseudonymC = Base64Encode (pseudonymC) | 14. pseudonymS = Base64Encode (pseudonymS) |
| 15. Store Client's address and shared key k along with name "Bob" and pseudonymC | 15. Store Server's address and shared key k, along with name "Alice" and pseudonymS |
| 16. Stop ESSPP | 16. Step ESSPP |

Referring to step 1 of protocol flow 4 illustrated above, the server and the client start ESSPP within a predetermined time interval of one another as with protocol flow 1. Server and client start ESSPP when registration triggers are activated on both server and client together within the predetermined time interval. In step 1, the server and the client broadcast a set of registration protocol startup messages to each other in an exchange in order to initiate the ESSPP between the two devices.

Note that neither the server nor the client, "Alice" and "Bob," reveal their identities during the process of protocol flow 4. The client and server only are able to identify each other through their respective pseudonyms that are generated in steps 13 and 14. Protocol flow 4 is implemented utilizing a Diffie-Hellman key exchange process.

Protocol Flow 5

Protocol flow 5 uses a different key agreement protocol than the ones used by protocol flows 1-4. Instead of performing a Diffie-Hellman key exchange, RSA encryption is used. Whereas the Diffie-Hellman key exchange requires the same amount of work to be performed by both devices in the exchange, with RSA encryption, one device has less work than the other. One device randomly chooses a shared key k, encrypts it, and sends it to the other device. The other device decrypts the shared key k. RSA encryption is much faster than RSA decryption; so slow devices can be given the task of encrypting while faster devices can perform the decrypting.

Before the exchange begins, Alice generates or somehow acquires an RSA public/private key pair.

| Alice | Bob |
|---|---|
| 1. Start ESSPP<br>2. Generate NonceS | 1. Start ESSPP |

→ "Alice", RSA public key (RA), NonceS →

| | |
|---|---|
| | 2. k = random number,<br>NonceC = random number,<br>encryptedK = K encrypted<br>using RA, NonceS and NonceC<br>3. Send message |

← "Bob", encryptedK

| Alice | Bob |
|---|---|
| 3. k = decrypt (encryptedK) using RSA<br>private key (Ra), NonceS, and NonceC<br>4. Stored Bob's name and shared key k;<br>5. Detect other devices running ESSPP<br>throughout previous steps and for an<br>additional wait period<br>6. Stop ESSPP | 4. Stored Alice's name and<br>shared key k;<br>5. Detect other devices running<br>ESSPP throughout previous steps<br>and for an additional wait period<br>6. Stop ESSPP |

There is a need to protect against a man-in-the-middle attacks with protocol flow 5 due to the fact that the RSA public key (RA) is not validated by a certificate authority.

A variety of enhancements can be made to protocol flow 5 such that Alice and Bob prove to each other knowledge of k by generating proof hashes similar to proofS and proofC. A PIN can also be included in the generated proof hashes to provide protection from man-in-the-middle attacks on some types of networks.

Referring to step 1 of protocol flow 5 illustrated above, the server and the client start ESSPP within a predetermined time interval of one another. Server and client start ESSPP when registration triggers are activated on both server and client together within the predetermined time interval. In step 1, the server and the client broadcast a set of registration protocol startup messages to each other in an exchange in order to initiate the ESSPP between the two devices.

Protocol Flow 6

This flow demonstrates how ESSPP can be performed in an EAP message exchange on a wireless network. The Authenticator runs on an access point device, and the Authentication Server is a RADIUS server that may or may not be running on the access point device. The Authentication Server is managed via a web interface. This web interface has menu selections that allow the Authentication Server to run ESSPP. The supplicant in this case is a headless device that has a button to press to start the execution of ESSPP.

| Supplicant | Authenticator | Authentication Server |
|---|---|---|
| 1. Start ESSPP<br>2. Scan for access points in range<br>3. Associate with access point in range | | 1. Start ESSPP |

← 4. Send EAP-Identity Request

5. Send EAP-Identity Response ("ESSPP_REGISTERING_DEVICE") →

6. Generate NonceS and send message

← EAP-Request/ESSPP containing (p, q, g), Ys, AddressS, NonceS

| Supplicant | | |
|---|---|---|
| 7. Validate parameters as required by<br>SSPP, generate NonceC, Zs,<br>proofC, and send message | | |

EAP-Response/ESSPP containing Yc, AddressC, NonceC, proofC →

8. Generate Zs, validate proofC, generate proofS,
generate shared key k. and send message ← EAP-Request/ESSPP containing proofS

| Supplicant | | |
|---|---|---|
| 9. Validate proofS, generate shared<br>key k, and send response containing<br>Client's name, optionally encrypted<br>using a key derived from k | | |

EAP-Response/ESSPP containing Client's name →

10. Send EAP-Success

← EAP-Success

| | | |
|---|---|---|
| | | 11. Use kdf( ) to generate client pseudonym that<br>can later be used for anonymous authentications |
| | 12. Store Server's shared key k | 12. Store Client's name, pseudonym, and shared<br>key k |

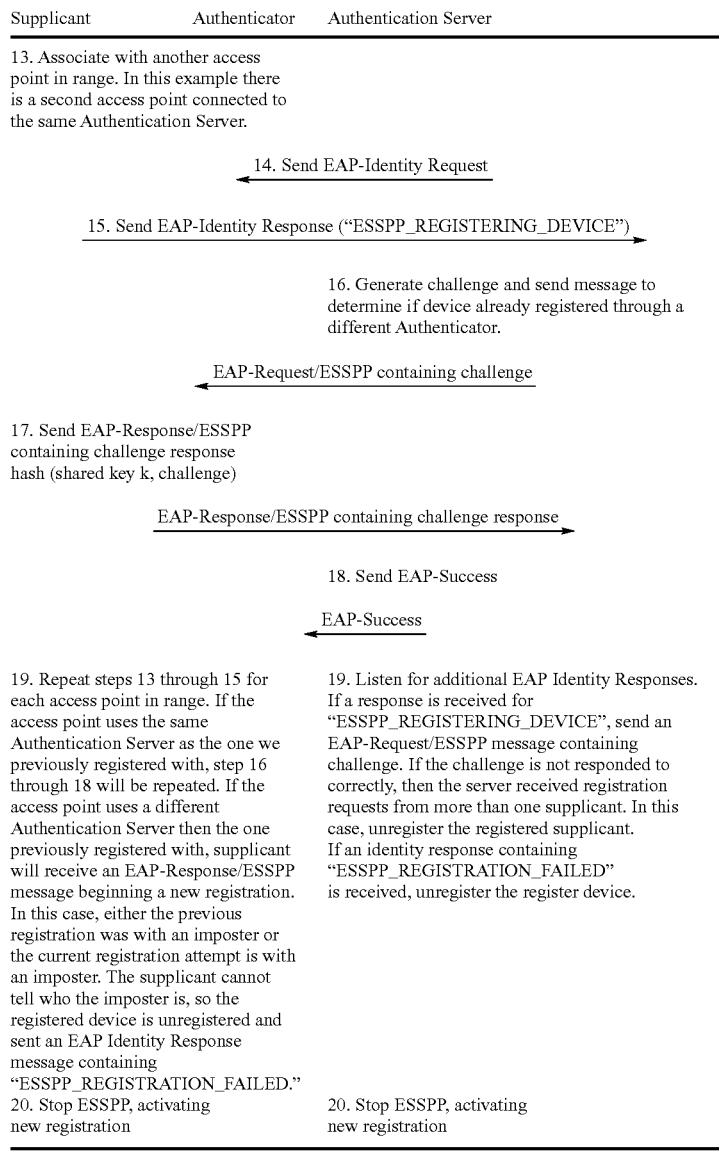

Protocol flow 6 illustrates how ESSPP can be deployed without changing access point (Authenticator) firmware. ESSPP is run between the supplicant and the authentication server.

After the supplicant starts running ESSPP, in step 2 it scans for all access points in its range. The supplicant will attempt to register with each access point in range. If more than one access point starts EAP-ESSPP to begin ESSPP registration (not just to issue a challenge), the supplicant will not activate the registration for any device. This is to avert a potential man-in-the-middle attack.

In step 5, the supplicant sends an EAP-Identity Response message with the user name set to "ESSPP_REGISTERING_DEVICE". The Authentication Server recognizes this special EAP-Identity Response message as coming from a supplicant in ESSPP mode.

In step 6, the Authentication Server begins the EAP-ESSPP protocol. The Authentication Server will only use this protocol with an unregistered device when it is running ESSPP to register a device.

In step 11, the Authentication Server generates and stores a pseudonym for the registering device, and will allow the device to authenticate using this pseudonym when 802.1x authentication is later performed, allowing the device ID to remain confidential.

Device registration is not activated until ESSPP completes execution. If the ESSPP protocol flow is not completely executed, the registration is not activated and the network device is not registered with the network.

When ESSPP is stopped on the supplicant, the user is given some indication of whether or not the registration was successful. Beeping patterns or light flashing patterns may indicate the result of the registration attempt. Likewise, Authentication Server logs and configuration will contain information about registered devices.

The established shared key may be used as the shared secret to use with an 802.1x authentication protocol (EAP). During the registration process, the registering client and server may use the generated shared key to derive encryption keys for an initial session between the client and server. If the initial session is stopped, the shared key may be used by the client and server to authenticate each other and establish new encryption keys using an 802.1x authentication protocol (EAP). If a shared key already exists, ESSPP can be used for 802.1x authentication without going through the ESSPP registration process.

Referring to step 1 of protocol flow 6 illustrated above, the server and the client start ESSPP within a predetermined time interval of one another. Server and client start ESSPP when registration triggers are activated on both server and client together within the predetermined time interval. In steps 2-3, the server and the client broadcast a set of registration protocol startup messages to each other in an exchange in order to initiate the ESSPP between the two devices.

Protocol Flow 7

Protocol flow 7 is similar to protocol flow 6, but in this flow, ESSPP is started at the Authenticator instead of at the Authentication Server. The access point (Authenticator) may have a button to press or provide a web-based interface to start ESSPP. When running ESSPP, the access point will include a special ESSPP-Mode attribute with (Access-Request) messages sent to the Authentication Server. The presence of this attribute indicates to the Authentication Server that EAP-ESSPP is allowed. In addition, the access point will include the text "ESSPP_OPEN_FOR_REGISTRATION" in EAP-Identity Request messages. Only one access point should be put into ESSPP mode at a time or registrations will fail.

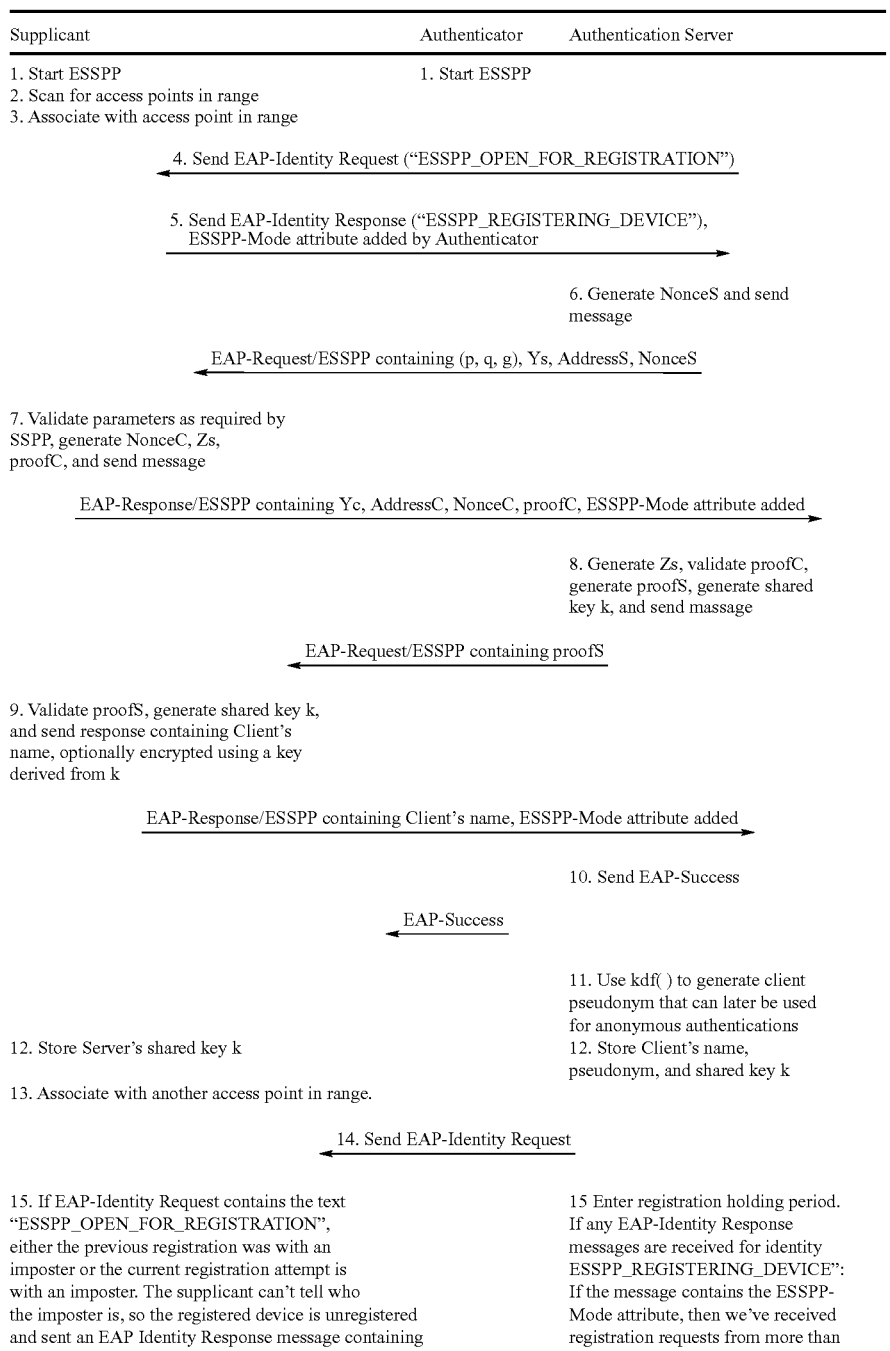

| Supplicant | Authenticator | Authentication Server |
|---|---|---|
| 1. Start ESSPP | 1. Start ESSPP | |
| 2. Scan for access points in range | | |
| 3. Associate with access point in range | | |

4. Send EAP-Identity Request ("ESSPP_OPEN_FOR_REGISTRATION")

5. Send EAP-Identity Response ("ESSPP_REGISTERING_DEVICE"), ESSPP-Mode attribute added by Authenticator 6. Generate NonceS and send message EAP-Request/ESSPP containing (p, q, g), Ys, AddressS, NonceS 7. Validate parameters as required by SSPP, generate NonceC, Zs, proofC, and send message EAP-Response/ESSPP containing Yc, AddressC, NonceC, proofC, ESSPP-Mode attribute added 8. Generate Zs, validate proofC, generate proofS, generate shared key k, and send massage EAP-Request/ESSPP containing proofS 9. Validate proofS, generate shared key k, and send response containing Client's name, optionally encrypted using a key derived from k EAP-Response/ESSPP containing Client's name, ESSPP-Mode attribute added 10. Send EAP-Success EAP-Success 11. Use kdf( ) to generate client pseudonym that can later be used for anonymous authentications 12. Store Server's shared key k 12. Store Client's name, pseudonym, and shared key k 13. Associate with another access point in range.

14. Send EAP-Identity Request

15. If EAP-Identity Request contains the text "ESSPP_OPEN_FOR_REGISTRATION", either the previous registration was with an imposter or the current registration attempt is with an imposter. The supplicant can't tell who the imposter is, so the registered device is unregistered and sent an EAP Identity Response message containing 15 Enter registration holding period. If any EAP-Identity Response messages are received for identity ESSPP_REGISTERING_DEVICE": If the message contains the ESSPP-Mode attribute, then we've received registration requests from more than

| Supplicant | Authenticator | Authentication Server |
|---|---|---|
| the text "ESSPP_REGISTRATION_FAILED" If EAP-Identity Request does not contain the text "ESSPP_OPEN_FOR_REGISTRATION" then the authentication process with the current access point is stopped and, if there is another access point in range, we go back to step 15. | | one supplicant. In this case, unregister the registered device. If the message does not contain the ESSPP-Mode attribute, then the server just received an invalid request. Fail the authentication attempt but keep the registered device registered. |
| 16. Stop ESSPP, activating new registration | | 16. Stop ESSPP, activating new registration |

Referring to step 1 of protocol flow 7 illustrated above, the server and the client start ESSPP within a predetermined time interval of one another. Server and client start ESSPP when registration triggers are activated on both server and client together within the predetermined time interval. In steps 2-3, the server and the client broadcast a set of registration protocol startup messages to each other in an exchange in order to initiate the ESSPP between the two devices.

Protocol flow 7 involves the use of multiple access points within the ESSPP environment. Referring to step 15 of the supplicant, the process with the current access point is stopped and goes to another access point if EAP-Identity Request does not contain the text "ESSPP_OPEN_FOR REGISTRATION." Also referring to step 15 of the supplicant, there is a failure in the ESSPP process if EAP-Identity Request contains the text "ESSPP_OPEN_FOR_REGISTRATION." This message indicates that there is a network device that is not properly registered with the network in spite of steps 1-14 of protocol 7. This message therefore indicates that the device registered in steps 1-14 is an imposter device that must be unregistered and that the device broadcasting the message "ESSPP_OPEN_FOR_REGISTRATION" is in fact the legitimate device that should be registered. Alternatively, the device broadcasting the message "ESSPP_OPEN_FOR_REGISTRATION" may in fact be the imposter device. Since the supplicant can not determine which device is the legitimate device and which device is the imposter device, the registered device is unregistered and sent a message "ESSPP_REGISTRATION_FAILED."

802.1x Authentication Choices

After EAP-ESSPP is used to establish a shared key between two devices, the devices can authenticate each other using 802.1x authentication. EAP methods that can perform mutual authentication using the generated shared key can be used. Such methods include Lightweight Extensible Authentication Protocol (LEAP) and EAP-SPEKE (Simple Password-Authenticated Exponential Key Exchange). However, the best choice is to use EAP-ESSPP itself, as this must already be available on the client and server. Below is a flow for EAP-ESSPP used for authentication using established credentials.

Protocol Flow 8

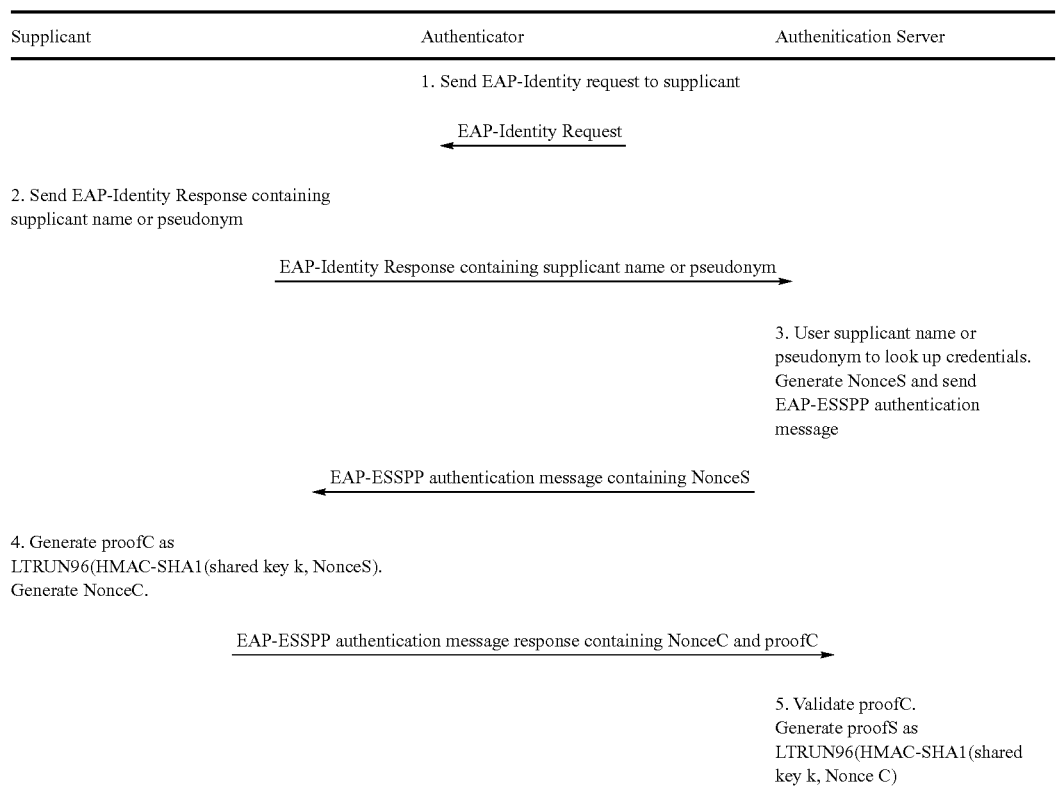

| Supplicant | Authenticator | Authenitication Server |
|---|---|---|

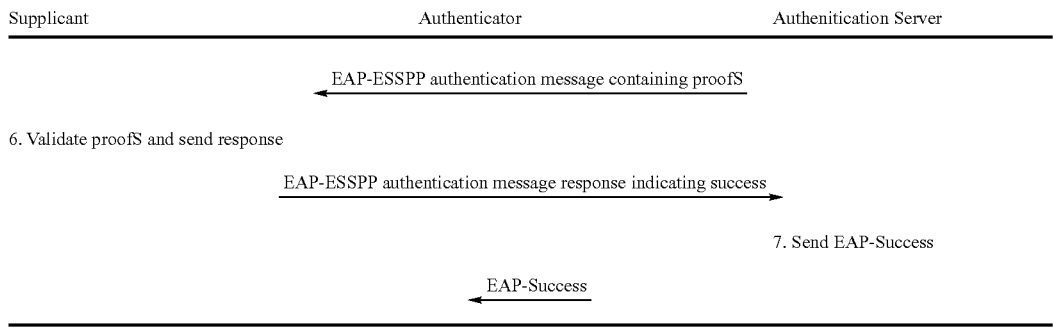

6. Validate proofS and send response

When used for authentication, EAP-ESSPP can also periodically regenerate the shared key k. The server somehow detects that the shared key k needs to be regenerated. This may be because a certain amount of time has passed or the shared key k has been used for a certain number of times. Instead of beginning EAP-ESSPP for authentication, the server begins EAP-ESSPP to provision a new key, using the old shared key k as the PIN to protect against attacks.

Protocol Flow 9

This flow shows how ESSPP can be run on an 802.11 network without using EAP. This flow requires additions to the 802.11 standard.

| Supplicant | Authenticator |
|---|---|
| 1. Start ESSPP | 1. Start ESSPP |
| 2. Scan for access points in range. Each access points provides capabilities information in beacon messages and in probe response messages. A bit in the capabilities field can be used to indicate that the access point is running ESSPP. This would allow the supplicant to use the probe command to scan for access points in ESSPP mode. If more than one access point is found in ESSPP mode, or no access point is found in ESSPP mode, the protocol fails immediately. | |

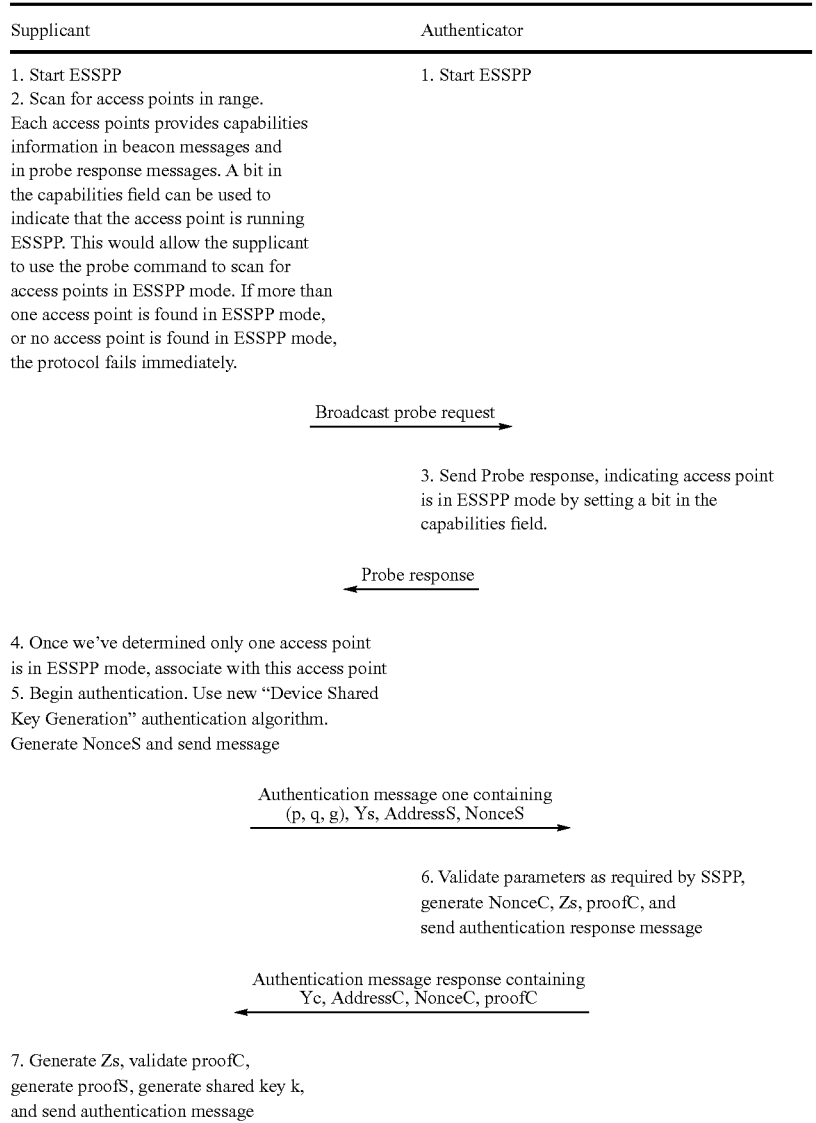

| Supplicant | Authenticator |
|---|---|
| | Authentication message two containing proofS → |
| | 8. Validate proofS, generate shared key k, and send response indicating success |
| | ← Authenticating message two, indicating success |
| 9. Store shared key k | 9. Store shared key k along with supplicant MAC address |
| 10. Stop ESSPP. If a man-in-the-middle attack causes the access point to discard the generated shared credentials, our attempts to authenticate using the "Device Shared Key" algorithm will fail | 10. Wait for a period of time to see if any other devices attempt to use the "Device Shared Key Generation" authentication algorithm. If any devices do, unregistered the supplicant device. |
| 11. Stop ESSPP, activating new registration | 11. Stop ESSPP, activating new registration |

The 802.11 standard specifies two authentication algorithms, Open System, and Shared Key. This flow requires two additional authentication algorithms:

1. Device Shared Key Generation—This authentication algorithm is used to establish a shared key using ESSPP key exchange.
2. Device Shared Key—This authentication algorithm uses shared keys generated by ESSPP key exchanges to authenticate devices. It is very similar to the existing Shared Key authentication algorithm except that instead of a device choosing between 1 of 4 possible shared keys, a distinct key is associated with each device (MAC address).

Referring to step 1 of protocol flow 9 illustrated above, the server and the client start ESSPP within a predetermined time interval of one another. Server and client start ESSPP when registration triggers are activated on both server and client together within the predetermined time interval. In steps 2-4, the server and the client broadcast a set of registration protocol startup messages to each other in an exchange in order to initiate the ESSPP between the two devices.

Protocol Flow 10

Sometimes, one-way authentication is used to establish a secure connection. For example, an SSL (Secure Sockets Layer) connection can be established between a Client and a Server with the Client authenticating the Server, but without the Server authenticating the Client. The flow below shows how ESSPP can be run on such a connection to establish credentials that can later be used for mutual authentication by the Client and Server.

| Server | Client |
|---|---|
| 1. Establish secure connection | 1. Establish secure connection |
| 2. Generate NonceS and send message | |
| (p, q, g), Ys, AddressS, NonceS → | |
| | 3. Validate parameters as required by SSPP, generate NonceC, Zs, proofC, and send message |
| ← Yc, AddressC, NonceC, proofC | |
| 4. Generate Zs, validate proofC, generate proofS and send message | |
| proofS → | |
| | 5. Validate proofS |
| 6. Generate shared key k | 6. Generate shared key k |
| 7. Store Client's address and shared key k | 7. Store Server's address and shared key k |

An SSL (Secured Sockets Layer) connection can be established between a Client and a Server without the Client providing any credentials. In this case, Server credentials can still be authenticated by the Client, allowing for one-way authentication. When an SSL connection is established in this way, a Server has a certificate that it can send to a Client to identify itself. The certificate contains the server's public key and a digital signature from a trusted party that the Client can verify to make sure the certificate properly identifies the Server. The Client can encrypt a message to the Server using the Server's public key. Only the Server will be able to decrypt the message, because only the Server knows the private key that corresponds to the public key. When an SSL connection is established, the Client authenticates the Server by verifying that the Server knows how to decrypt a message encrypted with the Server's public key. When one-way authentication is used, the Server does not authenticate the Client.

In step 1 of protocol flow 10, the client and server establish a secure connection using SSL, which allows for certain messages to be encrypted. ESSPP can then run over this connection, allowing the Client and Server to establish new credentials. The Client and Server can re-connect using the newly generated credentials instead of SSL. Connection-establishing credentials now allow for mutual authentication with ESSPP instead of one-way authentication with SSL.

In steps 2 and 3 of protocol flow 10, the server and client exchange registration information. This information includes address information AddressS and AddressC, portions of the Diffie-Hellman static key pair Ys and Yc, and random numbers NonceS and NonceC. In steps 3 and 4, the client and server generate a Diffie-Hellman shared secret Zs and exchange messages, proofC and proofS, indicating knowledge of such secret. The server and client validate these proof messages in steps 4 and 5 respectively. In steps 6 and 7, the client and server then generate a shared key, k, and store the key and address information for later use. In protocol 10, client and server generate shared key, k, without requiring a simultaneous triggering of registration processes at the Server and the Client device.

A simpler method of establishing credentials over an SSL connection is also possible. Because the Client and Server communicate over an encrypted connection, in step 2, the Server could pick a value for shared key k and send AddressS and shared key k to the Client. In step 3 the Client would then send the Server AddressC. Steps 4-6 are then skipped, and the Client and Server store credentials in step 7. In this case, if an attacker records the registration messages and later learns the Server's private key, the attacker may be able to decipher the recorded registration to learn the value of shared key k. Whether a Diffie-Hellman exchange is used to establish shared key k or not, the newly established credentials allow the Client and Server to re-connect with mutual authentication instead of one-way SSL authentication.

Transferring Keys

When device one successfully registers with device two using ESSPP, device one will store device two's credentials. Device two's credentials consist of information learned about device two, such as device two's name and address, as well as the generated shared key k. These credentials may be stored in a credential file. In certain environments, a credential file can be copied from device one to another device, such as device three, allowing device three to use the credentials to authenticate with device one. This allows devices that do not support the ESSPP protocol to utilize credentials generated using ESSPP. It also allows an administrator to switch devices in a network without running ESSPP.

ESSPP System Components

FIG. 1 illustrates a Wi-Fi network 10 that supports ESSPP in accordance with a preferred embodiment of the present invention. Wi-Fi network 10 includes network devices 12, 14, 16, and 18 that are numbered as devices 1, 2, n, and n+1 respectively. These numbered designations illustrate that network 10 may support as many as n+1 wireless devices.

Wireless network devices 12-18 are connected to Wi-Fi network through wireless access points 20 and 22 that are respectively numbered 1 and m. In order to support n+1 wireless network devices, network 10 may utilize as many as m wireless access points.

Wireless access points 20 and 22 numbered 1 and m may couple to other network devices 24, a virtual private network 26, as well as an authentication server 28. In addition, wireless access points 20 and 22 may couple to a terminal 30. Coupled to authentication server 28 is a storage facility 32.

Wireless network devices 12-18 are each provided with the mechanism that activates the ESSPP protocol on wireless network devices 12-18 as described in step 1 of protocol flows 1-7 and 9. This mechanism may take the form of a button, a switch, a menu selection on a Graphical User Interface (GUI), or some other embodiment of a trigger. Authentication server 28 is also provided with a mechanism that activates ESSPP protocol on authentication server 28 as described in step 1 of protocol flows 1-6. In protocol flow 7, ESSPP is triggered at the wireless access point and not with the authentication server. In protocol flow 9, ESSPP is also triggered at the wireless access point.

When ESSPP is activated on both one of network devices 12-18 and authentication server 28 within the predetermined time interval, ESSPP proceeds to step 2 as outlined in protocol flows 1-7 and 9. If ESSPP is not activated within the predetermined time interval, the ESSPP terminates at step 1 of protocol flows 1-7 and 9. If ESSPP is activated on one of said network devices 12-18 within a predetermined time interval of an activation of ESSPP on authentication server 28, then the ESSPP process commences and proceeds to step 2 of protocol flows 1-7 and 9.

All ESSPP communications between wireless network devices 12-18 and authentication server 28 occurs through wireless access points 20-22. While network devices 12-18 are illustrated as communicating with authentication server 28 through wireless network 10, other forms of communication are possible, such as via satellite, dial up connection, broadband, cable, fire-wire, an Internet and World Wide Web, as well as other methods.

Figure 2:
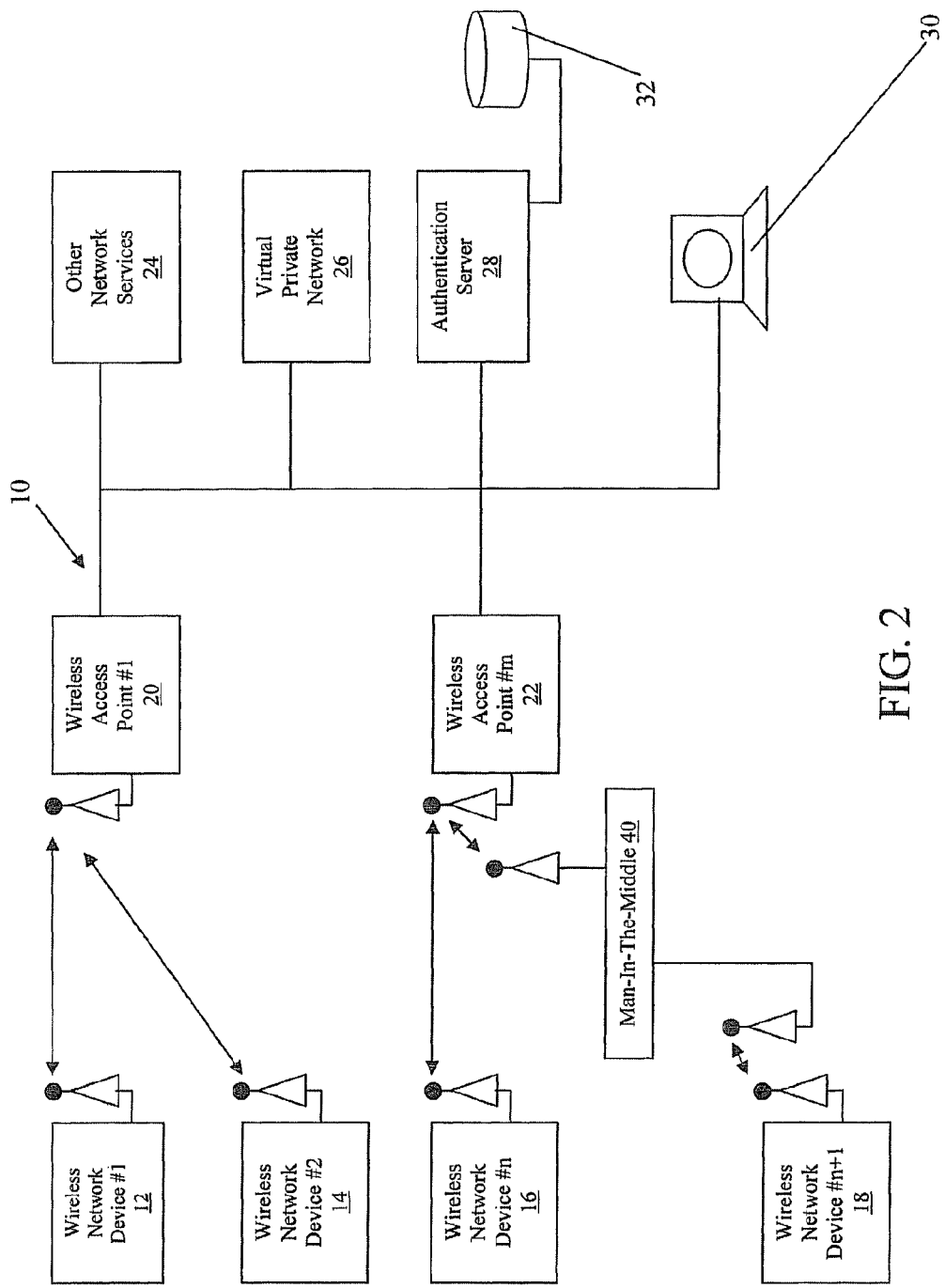
FIG. 2 illustrates a "man-in-the-middle" attack on a Wi-Fi network that supports ESSPP in accordance with a preferred embodiment of the present invention.

FIG. 2 illustrates a "man-in-the-middle" attack on Wi-Fi network 10 that supports ESSPP in accordance with a preferred embodiment of the present invention. Depicted in FIG. 2 is a man-in-the-middle device 40 that is attempting a man-in-the-middle attack on network 10. Man-in-the-middle device 40 broadcasts communications to either authentication server 28 or network device 18 via the same wireless channel that authentication server 28 and network device 18 are utilizing. Through broadcasting these communications, man-in-the-middle device 40 is attempting to interfere with the ESSPP process occurring between authentication server 28 and network device 18 and engage in a man in the middle attack. Through this man-in-the-middle attack, man-in-the-middle device 40 is attempting to register itself with authentication server 28 posing as wireless network device 18.

Monitoring systems supported on authentication server 28 and wireless network device 18 listen for ESSPP communications from man-in-the-middle device 40 in order to detect the man in the middle attack and react according to the ESSPP process as detailed in protocol flows 1-7 and 9. When such communications are detected from man-in-the-middle device 40, the monitoring systems on authentication server 28 and wireless network device 18 trigger authentication server 28 and network device 18 to terminate the ESSPP process in a preferred embodiment. To reinitiate the ESSPP process between authentication server 28 and network device 18, the ESSPP must be restarted with the triggering of the mechanisms to launch ESSPP at step 1. Alternatively, detection of these ESSPP signals from man-in-the-middle device 40 may only cause authentication server 28 and wireless network device 18 to suspend, or pause the ESSPP process at a particular step. At a later time, network device 18 and authentication server 28 may reinitiate ESSPP from where the process was last suspended, or may restart the process at an earlier step.

Figure 3:
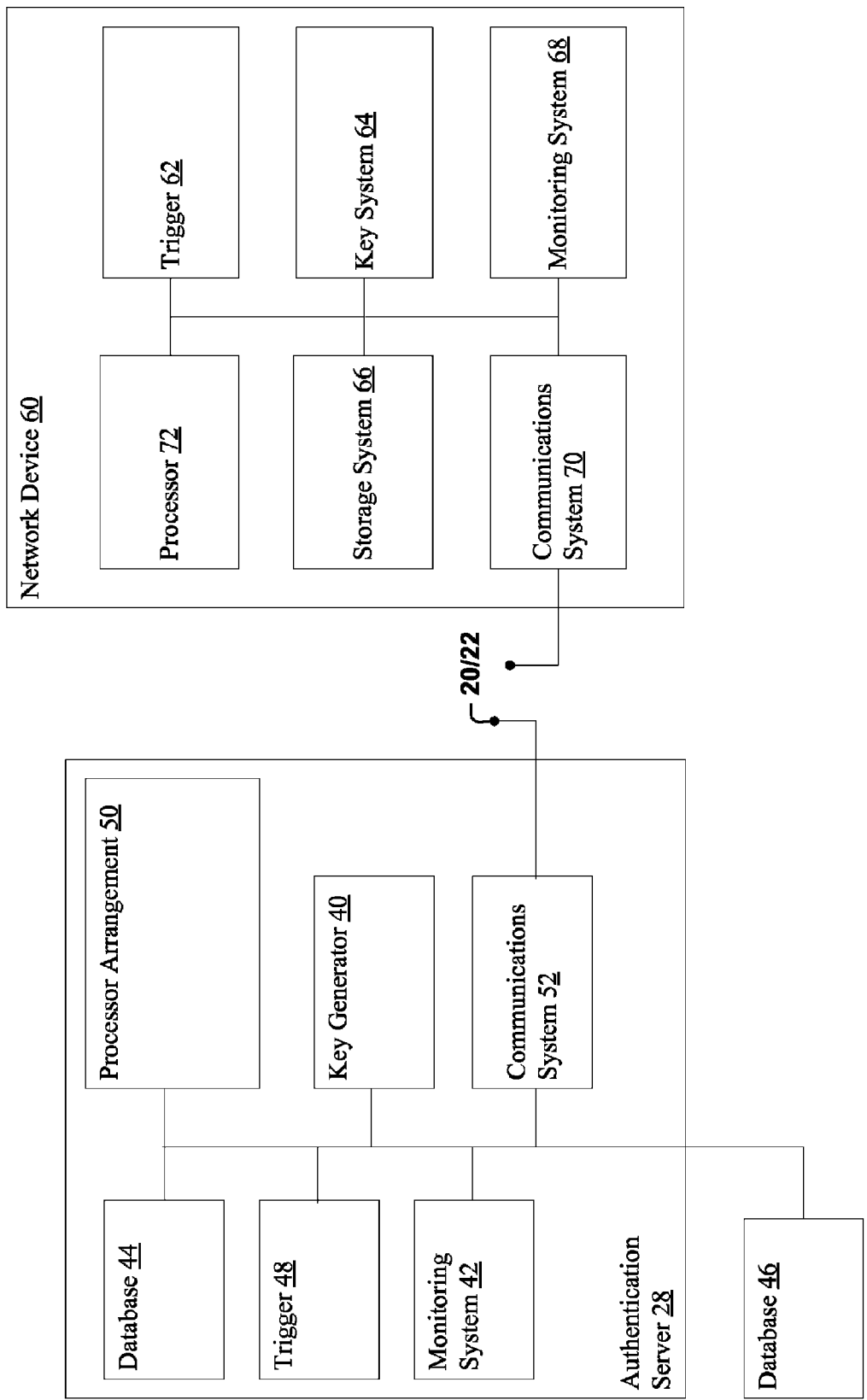
FIG. 3 illustrates a block diagram of an authentication server and a network device in accordance with a preferred embodiment of the present invention.

A block diagram depicting a system that supports the Enhanced Shared Secret Provisioning Protocol is illustrated in FIG. 3. Authentication server 28 supports a variety of subsystems that enable it to support the Enhanced Shared Secret Provisioning Protocol. Among these systems are a key generator 40 that supports the cryptographic keys used with the ESSPP process. Specifically, key generator 40 is able to create a cryptographic key in accordance with the ESSPP process, such as through a Diffie-Hellman process, an RSA process, or an EAP process. Monitoring system 42 enables server 28 to listen for communications from a foreign network device and detect a man-in-the-middle attack.

Authentication sever 28 includes an internal database 44 and/or an external database 46. Databases 44 and 46 are provided with authentication server 28 to enable authentication server 28 to store information including network system addresses and identity information, pseudonym information, cryptographic key information, and other related information.

Authentication server 28 supports a registration trigger 48, also referred to as a simultaneous registration trigger 48, that causes authentication server 28 to initiate execution of the ESSPP process when registration trigger 48 is activated. A processor arrangement 50 is provided that couples to database 44 and 46, trigger 48, monitoring system 42, and key generator 40.

A communications system 52 is coupled to server that enables authentication server 28 to communicate with remote network devices 12-18 through wireless access points 20 and 22. Alternatively, other methods of communication are suitable including communication via satellite, a computer network such as the Internet and a World Wide Web, LAN, or Ethernet, and broadband.

A network device 60 seeking to securely register with authentication server 28 is also illustrated. As with authentication server 28, network device 60 also supports a variety of subsystems that enable it to support the Enhanced Shared Secret Provisioning Protocol. Network device 60 includes a registration trigger 62, also referred to as a remote registration trigger 62, and simultaneous registration trigger 62. This trigger 62 initiates execution of the ESSPP process on network device 60 when trigger 62 is activated. Network device 60 includes a key system 64 that supports the cryptographic key in accordance with the ESSPP process. This support can include either generation or receipt and storage of a cryptographic key in accordance with the ESSPP process, such as through a Diffie-Hellman process, an RSA process, or an EAP process. Also, it is possible that server 28 could receive the cryptographic key from network device 60.

Storage system 66 provided on network device 60 provides data storage for network address information, identity information, pseudo names, cryptographic key, and other related information. Monitoring system 68 enables network device 60 to listen for communications from a foreign network device and detect a man-in-the-middle attack. A communications system 70 is provided to enable network device 60 to communicate with authentication server 28 through wireless or other communication methods. A processor arrangement 72 is provided that couples to storage system 66, trigger 62, monitoring system 68, communications system 70, and key system 64.

Diffie-Hellman Key Exchanges

The Diffie-Hellman key exchange is used to generate a key from which session keys can be derived. Wireless devices commonly use 128 bit session keys for symmetric encryption. The Diffie-Hellman key exchanges should therefore be as strong as a 128 bit symmetric key so that the Diffie-Hellman key exchange is not the weak link in the registration and authentication process.

The following table is taken from a recent Internet draft, "More MODP Diffie-Hellman groups for IKE". It is an equivalency table showing for different Diffie-Hellman prime moduli what symmetric key sizes are required to have equivalent strengths. The strength comparisons are estimates.

| | | Strength Estimate 1 | | Strength Estimate 2 | |
|---|---|---|---|---|---|
| Group | Modulus | in bits | exponent size | in bits | exponent size |
| 5 | 1536 bit | 90 | 180 | 120 | 240 |
| 14 | 2048 bit | 110 | 220 | 160 | 320 |
| 15 | 3072 bit | 130 | 260 | 210 | 420 |
| 16 | 4096 bit | 150 | 300 | 240 | 480 |
| 17 | 6144 bit | 170 | 340 | 270 | 540 |
| 18 | 8192 bit | 190 | 380 | 310 | 620 |

The table indicates that a 2048-bit Diffie-Hellman key provides the strength of a symmetric key probably somewhere between 110 and 160 bits in strength. Based on the estimates in this table, a 2048-bit Diffie-Hellman prime modulus is recommended for use with ESSPP on wireless networks.

ESSPP will use prime moduli defined in the IETF draft, "More MODP Diffie-Hellman groups for IKE". In a wireless network, the Authentication Server may indicate, by group number, which Diffie-Hellman prime modulus may be used. ESSPP devices will likely support groups 5, 14, and 15.

Wei Dai has published benchmarks for Diffie-Hellman key exchanges at: http://www.eskimo.com/~weidai/benchmarks.html His measurements indicate that Diffie-Hellman 2048 Key-Pair Generation and Key Agreement takes 49.19 milliseconds on a Celeron 850 MHz processor running Windows 2000 SP1.

The Diffie-Hellman key agreement protocol (also called exponential key agreement) was developed by Diffie and Hellman in 1976 and published in the ground-breaking paper "New Directions in Cryptography." The protocol allows two users to exchange a secret key over an insecure medium without any prior secrets.

The protocol has two system parameters p and g. They are both public and may be used by all the users in a system. Parameter p is a prime number and parameter g (usually called a generator) is an integer less than p, with the following property: for every number n between 1 and p−1 inclusive, there is a power k of g such that $n=g^k$ mod p.

Suppose Alice and Bob want to agree on a shared secret key using the Diffie-Hellman key agreement protocol. They proceed as follows: First, Alice generates a random private value a and Bob generates a random private value b. Both a and b are drawn from the set of integers $\{1, \ldots, p-2\}$. Then they derive their public values using parameters p and g and their private values. Alice's public value is $g^a$ mod p and Bob's public value is $g^b$ mod p. They then exchange their public values. Finally, Alice computes $g^{ab}=(g^b)^a$ mod p, and Bob computes $g^{ba}=(g^a)^b$ mod p. Since $g^{ab}=g^{ba}=k$, Alice and Bob now have a shared secret key k.

The protocol depends on the discrete logarithm problem for its security. It assumes that it is computationally infeasible to calculate the shared secret key $k=g^{ab}$ mod p given the two public values $g^a$ mod p and $g^b$ mod p when the prime p is sufficiently large. Maurer has shown that breaking the Diffie-Hellman protocol is equivalent to computing discrete logarithms under certain assumptions.

The Diffie-Hellman key exchange is vulnerable to a man-in-the-middle attack. In this attack, an opponent Carol intercepts Alice's public value and sends her own public value to Bob. When Bob transmits his public value, Carol substitutes it with her own and sends it to Alice. Carol and Alice thus agree on one shared key and Carol and Bob agree on another shared key. After this exchange, Carol simply decrypts any messages sent out by Alice or Bob, and then reads and possibly modifies them before re-encrypting with the appropriate key and transmitting them to the other party. This vulnerability is present because Diffie-Hellman key exchange does not authenticate the participants. Possible solutions include the use of digital signatures and other protocol variants.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the disclosure, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

What is claimed:

1. A first device storing instructions which, when executed, perform a method comprising:
    launching a registration process, the launching beginning a predetermined time interval within which the registration process is to be launched on a second device, the first device and the second device each having a registration trigger;
    transmitting registration information to the second device;
    receiving registration information from the second device;
    generating a secret, without knowledge prior to launching the registration process of information associated with the second device, the generation of the secret enabling authenticated communications between the first device and the second device;
    transmitting an acknowledgement to the second device;
    receiving an acknowledgement from the second device, the receipt of the acknowledgement assuring that the secret is shared with the second device;
    monitoring the registration process for registration communications emitting from a third device;
    completing the registration process if no registration communications emitting from a third device are detected; and
    not completing the registration process if any registration communications from a third device are detected.

2. The first device of claim 1, wherein the method further comprises generating a pseudonym designating at least one of the first device and the second device.

3. The first device of claim 1, wherein the registration information does not include a plain-text identity of at least one of the first device and the second device, thereby making the registration process at least partially hidden.

4. The first device of claim 1, wherein registration information includes PIN number information.

5. The first device of claim 1, wherein the launching of the registration process comprises launching of a registration process on a Wi-Fi network device.

6. The first device of claim 1, wherein the launching of the registration process comprises launching of a registration process on a network device that is at least one of a server, wireless printer, wireless computer, or a network access point.

7. The first device of claim 1, wherein the method further comprises performing encrypted authenticated communications between the first device and the second device.

8. A system, comprising:
    a server supporting a first part of a registration process;
    a network device supporting a second part of a registration process;
    a pair of registration triggers, the server and the network device each supporting one of the pair of registration triggers, wherein activation of the pair of registration triggers within a predetermined time interval launches the first and second parts of the registration processes;
    a communications link coupling the server to the network device, the communications link transmitting:
    a set of registration data exchanged between the server and the network device after the launching of the first and second parts of the registration process;
    a cryptographic secret formed at least one of the server and the network device and shared between the server and the network device, the cryptographic secret being formed by each of the at least one of the server and the network device without knowledge prior to registration of information associated with the other of the at least one of the server and the network device, the formation of the cryptographic secret facilitating authentic communications between the server and the network device; and
    a database that stores the registration data and the cryptographic secret; and
    a monitoring system that detects a registration signal that might emanate from a third device, whereby detection of any the registration signal from the third device prevents registration of the network device as part of the registration process.

9. The system of claim 8, wherein registration of the network device includes the use of a PIN number.

10. The system of claim 8, further including a step of generating a pseudonym for at least one of the server and the network device.

11. The system of claim 8, wherein the registration data for at least one of the server and the network device does not include a plain-text device identifier, thereby making the registration process at least partially hidden.

12. The system of claim 8, wherein the network device is a Wi-Fi network device.

13. The system of claim 8, wherein the network device is at least one of a wireless printer, wireless computer, or a network access point.

14. A system providing a capability for two network devices to communicate securely, the system comprising:
    a trigger associated with each of the two network devices, the trigger associated one of the network devices indicating a desire to launch a registration process between the two network devices when activated on the one network device, the registration process being launched when the trigger associated with the other of the two network devices is activated within a predetermined time interval of the trigger being activated on the one network device;
    a communications system associated with each of the two network devices, the communications system associated with each of the network devices transmitting registration information to the other of the two network devices;
    a key generator associated with at least one of the two network devices generating a key without pre-registration knowledge of information associated with the other network device, the key enabling an authenticated communications capability between the two network devices, the communications system further transmitting an acknowledgement between the two network devices when the authenticated communications capability between the two network devices is enabled;

a monitoring system that monitors the registration process for registration communications emitting from a third device, the monitoring system allowing completion of the registration process if no registration communications emitting from a third device is detected, and causing the registration process to not be completed if any registration communications from a third device are detected.

15. The system of claim 14, wherein the key generator further enables encrypted authenticated communications between the two network devices.

* * * * *